United States Patent
Zhou

(10) Patent No.: US 10,574,992 B2
(45) Date of Patent: *Feb. 25, 2020

(54) METHOD AND APPARATUS FOR SUB-PICTURE BASED RASTER SCANNING CODING ORDER

(71) Applicant: Texas Instruments Incorporated, Dallas, TX (US)

(72) Inventor: Minhua Zhou, San Diego, CA (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/167,134

(22) Filed: Oct. 22, 2018

(65) Prior Publication Data

US 2019/0058884 A1 Feb. 21, 2019

Related U.S. Application Data

(63) Continuation of application No. 14/664,992, filed on Mar. 23, 2015, now Pat. No. 10,110,901, which is a continuation of application No. 13/179,174, filed on Jul. 8, 2011, now Pat. No. 8,988,531.

(60) Provisional application No. 61/485,200, filed on May 12, 2011, provisional application No. 61/362,468, filed on Jul. 8, 2010.

(51) Int. Cl.
| | | |
|---|---|---|
| H04N 3/28 | (2006.01) | |
| H04N 19/129 | (2014.01) | |
| H04N 19/433 | (2014.01) | |
| H04N 19/119 | (2014.01) | |
| H04N 19/174 | (2014.01) | |
| H04N 19/436 | (2014.01) | |

(52) U.S. Cl.
CPC ......... *H04N 19/129* (2014.11); *H04N 19/119* (2014.11); *H04N 19/174* (2014.11); *H04N 19/433* (2014.11); *H04N 19/436* (2014.11)

(58) Field of Classification Search
USPC ........................................................ 348/206
See application file for complete search history.

(56) References Cited

U.S. PATENT DOCUMENTS

| | | | |
|---|---|---|---|
| 7,719,540 B2 | 5/2010 | Piazza et al. | |
| 7,822,119 B2 | 10/2010 | Boon et al. | |
| 7,830,959 B2 | 11/2010 | Park et al. | |
| 8,988,531 B2 * | 3/2015 | Zhou ................... | H04N 19/433 348/206 |
| 10,110,901 B2 * | 10/2018 | Zhou ................... | H04N 19/433 |
| 2003/0123557 A1 | 7/2003 | De With et al. | |

(Continued)

OTHER PUBLICATIONS

"Group, v." OED Online. Oxford University Press, Sep. 2016. Web. Dec. 5, 2016.

*Primary Examiner* — Michael B. Pierorazio
(74) *Attorney, Agent, or Firm* — Peter K. McLarty; Charles A. Brill; Frank D. Cimino

(57) ABSTRACT

A method and apparatus for sub-picture based raster scanning coding order. The method includes dividing an image into even sub-pictures, and encoding parallel sub-pictures on multi-cores in raster scanning order within sub-pictures, wherein from core to core, coding of the sub-picture is independent around sub-picture boundaries, and wherein within a core, coding of a sub-picture is at least one of dependent or independent around sub-picture boundaries.

5 Claims, 5 Drawing Sheets

(56) References Cited

U.S. PATENT DOCUMENTS

| | | |
|---|---|---|
| 2003/0159139 A1 | 8/2003 | Candelore et al. |
| 2004/0003178 A1 | 1/2004 | Magoshi |
| 2004/0010614 A1 | 1/2004 | Mukherjee et al. |
| 2004/0022543 A1 | 2/2004 | Hosking et al. |
| 2005/0219253 A1 | 10/2005 | Piazza et al. |
| 2008/0031329 A1 | 2/2008 | Iwata et al. |
| 2008/0094419 A1 | 4/2008 | Leigh et al. |
| 2008/0123750 A1 | 5/2008 | Bronstein et al. |
| 2009/0094658 A1 | 4/2009 | Kobayashi |
| 2010/0091836 A1 | 4/2010 | Jia |
| 2010/0091880 A1 | 4/2010 | Jia |
| 2010/0097250 A1 | 4/2010 | Demircin et al. |
| 2010/0098155 A1 | 4/2010 | Demircin et al. |
| 2010/0118945 A1 | 5/2010 | Wada et al. |
| 2010/0128797 A1 | 5/2010 | Dey |
| 2010/0195922 A1 | 8/2010 | Amano et al. |
| 2010/0246683 A1 | 9/2010 | Webb et al. |
| 2010/0260263 A1 | 10/2010 | Kotaka et al. |
| 2010/0296744 A1 | 11/2010 | Boon et al. |
| 2010/0321428 A1 | 12/2010 | Saito et al. |
| 2011/0182523 A1 | 7/2011 | Kim et al. |

\* cited by examiner

METHOD AND APPARATUS FOR SUB-PICTURE BASED RASTER SCANNING CODING ORDER

CROSS-REFERENCE TO RELATED APPLICATIONS

This application is a continuation of application Ser. No. 14/664,992, filed Mar. 23, 2015, which is a continuation of application Ser. No. 13/179,174, filed Jul. 8, 2011 (now U.S. Pat. No. 8,988,531), which claims the benefit of U.S. Provisional Application No. 61/362,468, filed Jul. 8, 2010 and 61/485,200 filed May 12, 2011 the entireties of all of which are hereby incorporated by reference.

BACKGROUND OF THE INVENTION

Field of the Invention

Embodiments of the present invention generally relate to a method and apparatus for sub-picture based raster scanning coding order.

Description of the Related Art

The High Efficiency Video Coding (HEVC) has a design goal of being more efficient than the MPEG AVC/H.264 High profile. One of the application areas of this standard is the ultra high definition (UHD) video coding, in which the picture or image size can go up to 8K×4K (7680×4320). The big picture size poses great challenge for the chip design to devise cost-effective video solutions. This is due to the fact that the UHD requires even bigger search range in the motion estimation for providing the intended coding efficiency of such a standard. On-chip memory, for buffering the reference blocks for the motion estimation and compensation, tends to be expensive, which is a major limiting factor for a cost-effective UHD video solutions. Also, UHD HEVC coding may well beyond the capability of a single video core, multi-core based platforms may become popular in the future for HEVC UHD solutions.

Therefore, there is a need for improved method and/or apparatus for sub-picture based raster scanning coding order.

SUMMARY OF THE INVENTION

Embodiments of the present invention relate to a method and apparatus for sub-picture based raster scanning coding order. The method includes dividing an image into even sub-pictures, and encoding parallel sub-pictures on multi-cores in raster scanning order within sub-pictures, wherein from core to core, coding of the sub-picture is independent around sub-picture boundaries, and wherein within a core, coding of a sub-picture is at least one of dependent or independent around sub-picture boundaries.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
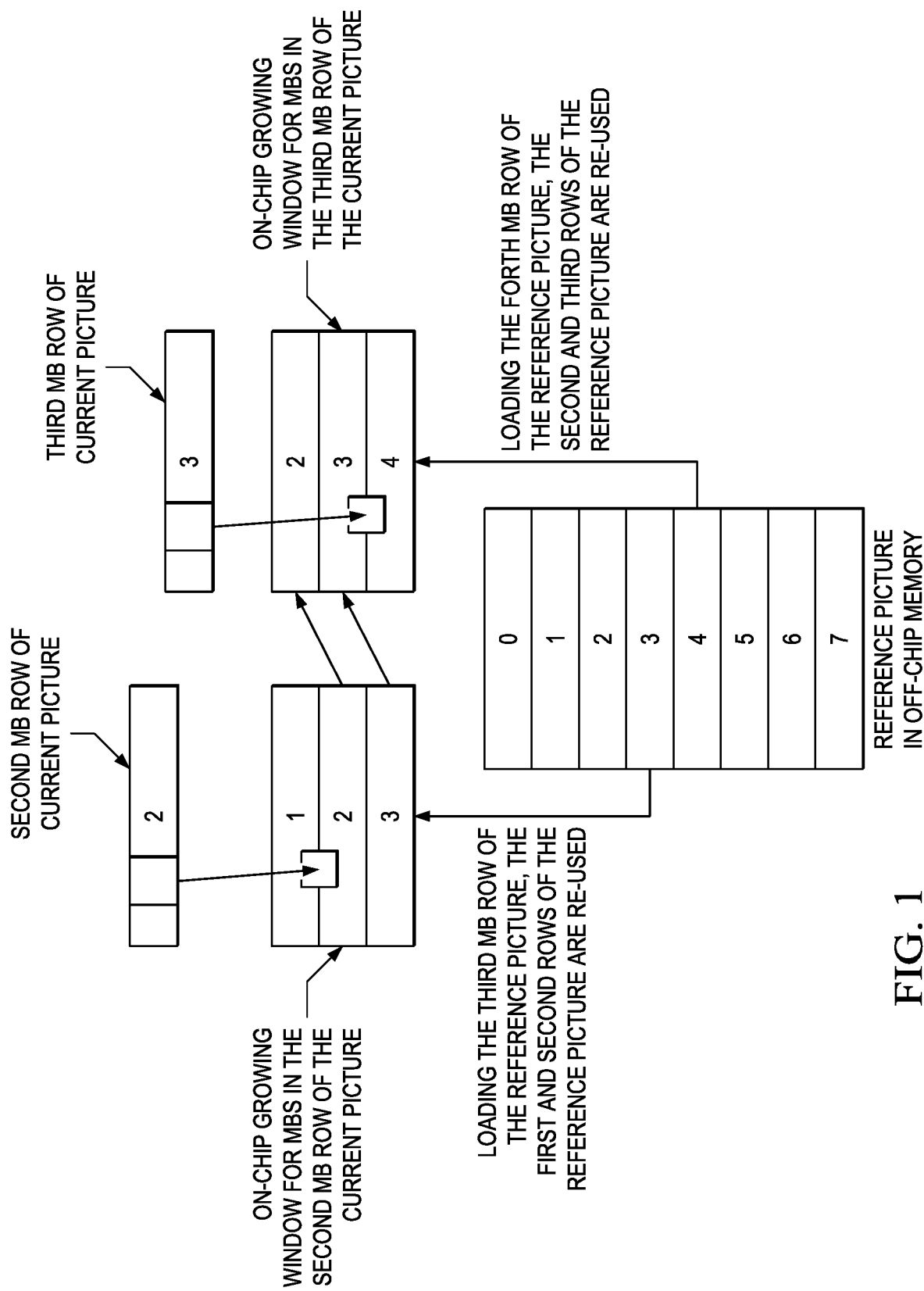
FIG. 1 is an embodiment of a motion estimation with growing search window.

In video coding, the growing search window is commonly used to minimize the memory bandwidth, the data traffic between on-chip and off-chip, required for loading the reference data for the motion estimation and motion compensation. FIG. 1 is an embodiment of motion estimation with growing search window. FIG. 1 illustrates the growth of widow works. Both the reference picture and current picture can be divided into a set of non-overlapped macroblock (MB) rows. In this example, the picture has 8 MB rows, each MB row is made up of a same amount of MBs determined by the horizontal picture size and macroblock size. In the growing window fashion, the horizontal reference block size is equal to the horizontal picture size, the vertical size of the reference block depends on the on-chip memory size available for the motion estimation and compensation. As shown in FIG. 1, the reference block size of the growing window size has 3 MB rows. For the growing window used for the MBs of the $2^{nd}$ MB row in the current picture, row 1 and 2 are re-used from the previous growing window, which is the growing window for MB row 1 of the current picture. In one embodiment, row 3 of the reference data is loaded from the off-chip memory; likewise, for the growing window used for the MBs of the $3^{rd}$ MB row in the current picture, only row 4 of reference data is loaded from the off-chip memory. Rows 2 and 3 of reference data are re-used from the previous growing window; so on and so forth. Therefore, with the growing window search strategy, only one MB row of reference data needs to be loaded when the coding of the current picture is moving from the one MB row to the next row.

For search range srX*srY, the on-chip memory size required by the growing window can be computed by using the equation below $$\text{MemSize} = (2*srY+N)*\text{picWidth} \qquad (1)$$

where N×N is MB size, picWidth is the horizontal size of the picture.

For 8K×4K (7680×4320) video, if the search range is 256×256, and MB size is 64×64, the on-chip memory size for the growing widow will be 4,423,680 bytes (over 4.4 Mbytes). This is very expensive for the chip design. Therefore, it is desirable for this standard to enable big enough search range for the UHD coding while still keep the on-chip memory size requirements in check.

In addition, for UHD coding multi-core solutions may become vital because it might be well beyond the capability of single core processor to handle real-time encoding/decoding of UHD video, such as, 8K×4K, 120 frame/sec.

Therefore, it is desirable that the HEVC standard can design in features that can facilitate the multi-core paralleling processing.

In order to reduce the on-chip memory requirements without impacting the coding efficiency, the traditional picture-based rater-scanning order coding is extended, as shown in FIG. 2 (a) to sub-picture based raster scanning order coding shown in FIGS. 2 (b), (c) and (d). The division of a picture into sub-pictures can be signaled in the high-level syntax, such as, in the sequence parameter set. While macroblocks inside a sub-picture follow the rater-scanning order, the sub-pictures of a picture also follow the raster scanning coding order, such as, from left to right, from top to bottom. The coding the sub-pictures does not need to be independent; rather, it depends on the slice partitioning within the picture. FIGS. 2(b)-2(d) depicts various embodiments of sub-picture partitioning; however, other patterns of sub-picture partitioning are also possible.

Figure 2A:
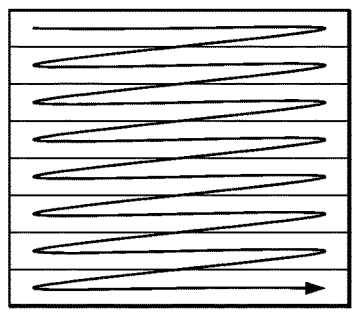
FIG. 2(a) non sub-picture partitioning, FIG. 2(b) a picture is partitioned into two sub-pictures, FIG. 2(c) a picture is partitioned into three sub-pictures, and FIG. 2(d) a picture is partitioned into four sub-pictures.
Figure 2B:
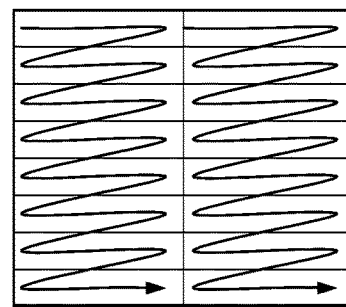
Figure 2C:
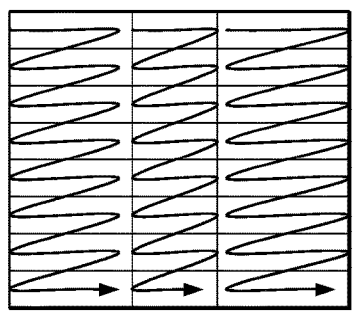
Figure 2D:
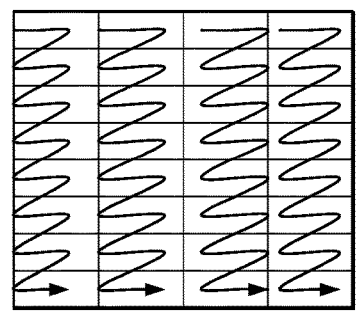

The sub-pictures on the vertical picture boundary in FIGS. 2(b)-2(d) and rest of sub-pictures may have different horizontal size in order to keep the exact same search ranges for all the sub-pictures under the same growing window memory size. This is the consequence of the sub-pictures on the vertical picture boundary. Thus, the search window has to overlap with the neighboring sub-picture by srX pixels to the right or the left direction. However, the sub-pictures inside the picture, the search window has to overlap with the neighboring sub-pictures by a total of 2*srX picture, where srX pixels to the right and left. Therefore, in this embodiment of partitioning of sub-pictures, the horizontal size of sub-pictures on the vertical picture boundary will be larger than the rest of sub-pictures by srX pixels.

If we treat (a) as the special case of the sub-picture partitioning, for search range srX*srY, the on-chip memory size required by the growing window in the sub-picture coding mode can be computed as $$MemSize = (2*srY + N) * \frac{picWidth + 2*(K-1)*srX}{K}, \quad (2)$$

where K is the number of sub-pictures.

TABLE 1

| srX | srY | N | K | picWidth | memSize (bytes) |
|-----|-----|---|---|----------|-----------------|
| 256 | 256 | 64 | 1 | 7680 | 4423680 |
| 256 | 256 | 64 | 2 | 7680 | 2359296 |
| 256 | 256 | 64 | 3 | 7680 | 1671168 |
| 256 | 256 | 64 | 4 | 7680 | 1327104 |
| 256 | 256 | 64 | 5 | 7680 | 1120666 |
| 256 | 256 | 64 | 6 | 7680 | 983040 |

Table 1 lists the growing window memory size for different number of sub-pictures. As shown in Table 1, even if the picture is divided into two sub-pictures, the on-chip memory requirement for the growing window almost goes down by half, which is significant cost saving for the chip design.

For multi-core paralleling processing, a picture can be evenly divided into the sub-pictures so that each core has balanced loading. For hardware implementation it is extremely critical that picture can be divided evenly to minimize the implementation cost. This is due to the fact that cores are simply replicated, each core is designed to deal with real-time encoding/decoding of the sub-picture of largest size. Therefore, to minimize the largest sub-picture size during the process of dividing the picture into sub-pictures is the key for reducing the hardware implementation cost of multi-core codec.

Normally, a picture cannot be evenly divided into sub-pictures in a perfect fashion, the sub-pictures having equal size. For example, for 1080p sequences (1920×1080 picture size), if the largest coding unit (LCU) size is 64×64, the picture size will be 30×17 in units of LCUs. In HEVC traditional macroblock concept of 16×16 block size maybe extended to LCU, which is up to 64×64 block size. If the picture is divided into 4×2 sub-pictures, such as, a number of sub-picture columns is 4 and number of sub-picture rows is 2), it will lead to sub-pictures of different size, because 30 is not a multiple of 4 and 17 is not multiple of 2. Hence, the sub-picture size is decomposed 30 into 7+7+8+8 and 17 into 8+9. As a result, the sub-picture of largest size has 8×9 LCUs and sub-picture of smallest size has 7×8 LCUs. Alternatively, horizontal picture size 30 can be divided into 7+7+7+9, but this kind of partitioning is less desirable because it results in the largest sub-picture size of 9×9 LCUs. The implementation may become more expensive because each core would need to be able to handle sub-pictures of size 9×9 LCUs instead of 8×9 LCUs in real-time.

Thus, in one embodiment, dividing a picture into sub-pictures for multi-core paralleling processing is done by limiting the sub-picture size difference between the largest sub-picture and smallest sub-picture to be less than or equal to one LCU in the horizontal and vertical directions.

For example, let picture size be W*H, in unit of LCUs, and n*m be number of sub-pictures to be divided, then $$\begin{cases} W = (n-k)*x + k*(x+1) = n*x + k \\ H = (m-j)*y + j*(y+1) = m*y + j \end{cases}$$

where x*y is smallest sub-picture size, and (x+1)*(y+1) is largest sub-picture size. In horizontal direction, k columns of sub-pictures will have size of (x+1) and (n-k) columns of sub-picture have size of x. Likewise, in vertical direction, j rows of sub-pictures will have size of (y+1) and (m-j) rows of sub-picture have size of y. x, y, k and j are all integers and in units of LCUs, they are determined by $$\begin{cases} x = W/n \\ k = W \% n \\ y = H/m \\ j = H \% m \end{cases}$$

For example, for W*H=30×17 and n*m=4×2, we have $$\begin{cases} x = 30/4 = 7 \\ k = 30 \% 4 = 2 \\ y = 17/2 = 8 \\ j = 17 \% 2 = 1 \end{cases}$$

Figure 3:
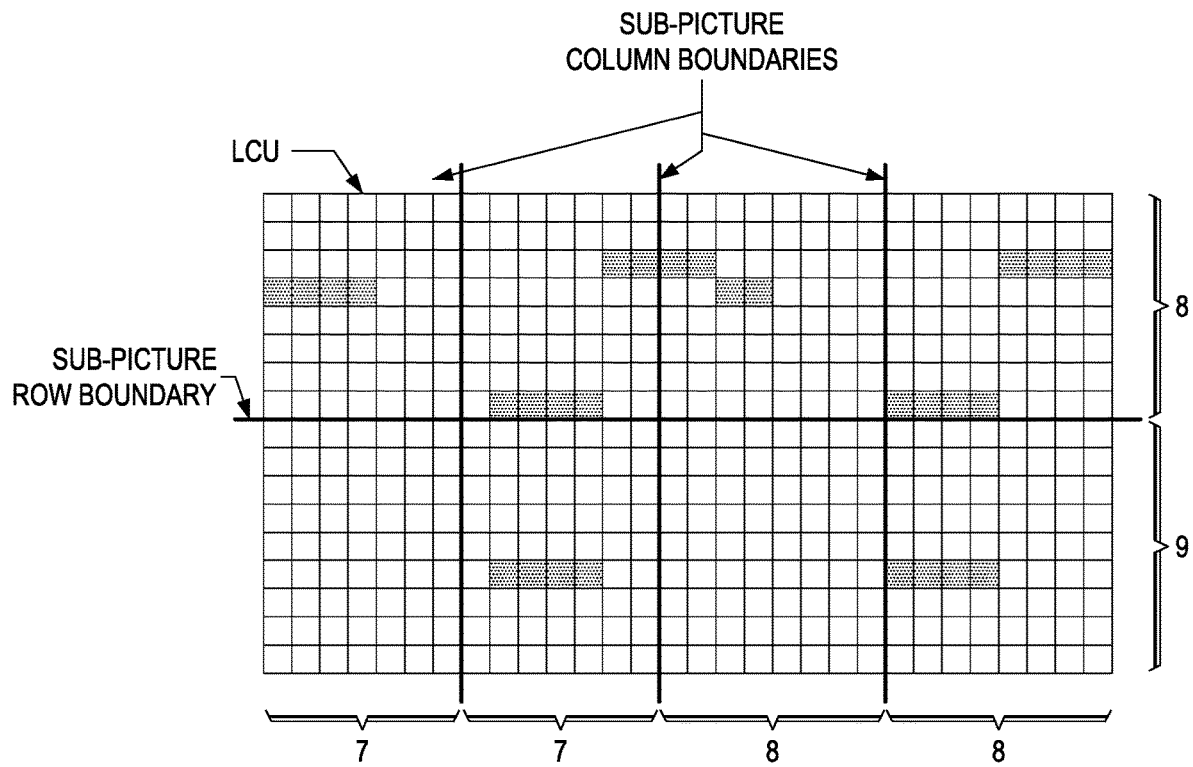
FIG. 3 is an embodiment of sub-picture partitioning for multi-core parallel processing purpose.

FIG. 3 is an embodiment of sub-picture partitioning for multi-core parallel processing purpose. In FIG. 3, a 30×17 picture (1080p) is evenly divided into 4×2 sub-pictures, with largest sub-picture size of 8×9 and smallest sub-picture size of 7×8. Then, W=30 is decomposed into 30=7+7+8+8, and H=17 is decomposed into 17=8+9, which is an optimal sub-picture partitioning discussed above.

In one embodiment, the sub-picture size difference between the largest sub-picture and smallest sub-picture is limited to be less than or equal to one LCU in each direction, and specifies the way to compute sub-picture sizes and the number of sub-pictures of determined sizes. Such an embodiment may not impose any constraints on the sub-picture partitioning order.

Figure 4:
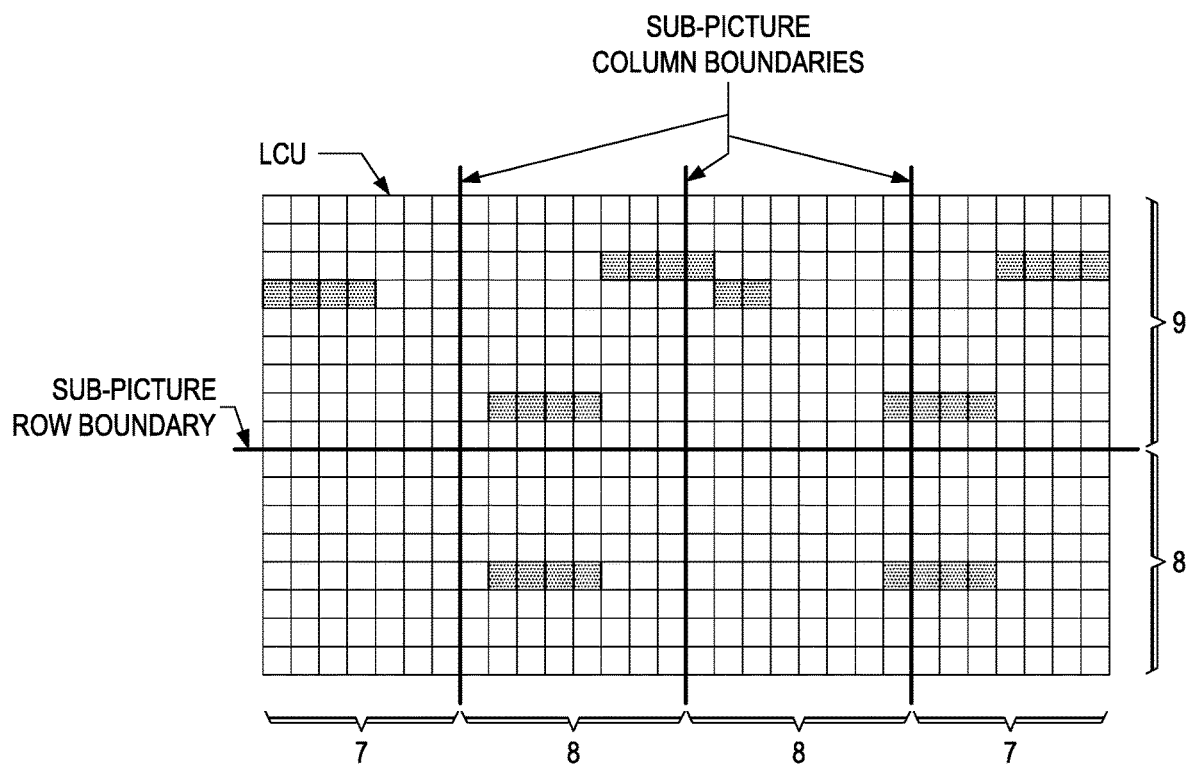
FIG. 4 is an embodiment of an alternative sub-picture partitioning for multi-core parallel processing purpose.

FIG. 4 is an embodiment of an alternative sub-picture partitioning for multi-core parallel processing purpose. FIG. 4 shows an alternative sub-picture partitioning order which is different from that of FIG. 3, wherein a 30×17 picture (1080p) is evenly divided into 4×2 sub-pictures in an alternative order, with largest sub-picture size of 8×9 and smallest sub-picture size of 7×8. That is, once the sizes and numbers of sub-pictures are determined based on the proposed method, it is up to users to divide a picture into sub-pictures of determined sizes and numbers in any possible order.

As mentioned above, the sub-picture based raster scanning order coding significantly reduces the on-chip memory requirements for motion estimation and compensation while maintaining the intended coding efficiency, thus, reduces the chip cost for the UHD video solutions. It also provides a way of evenly divide a picture into sub-pictures to minimize the implementation cost of multi-core HEVC codecs.

Figure 5:
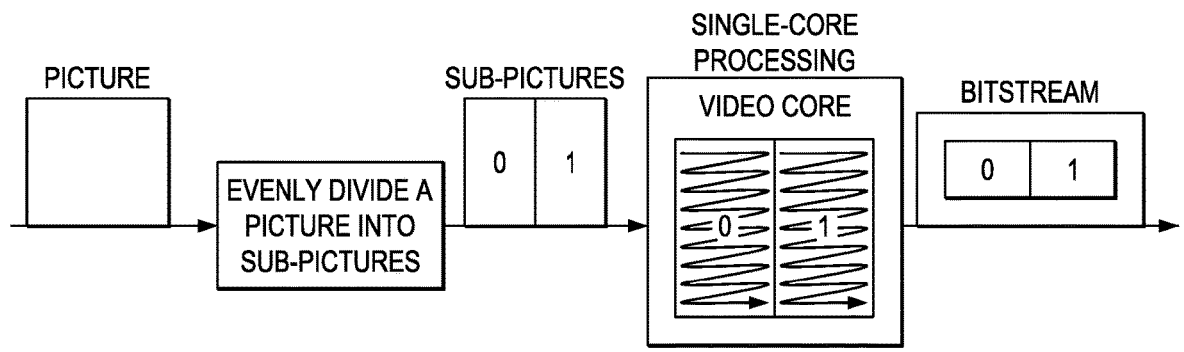
FIG. 5 is an embodiment of high quality coding with sub-pictures.
Figure 6:
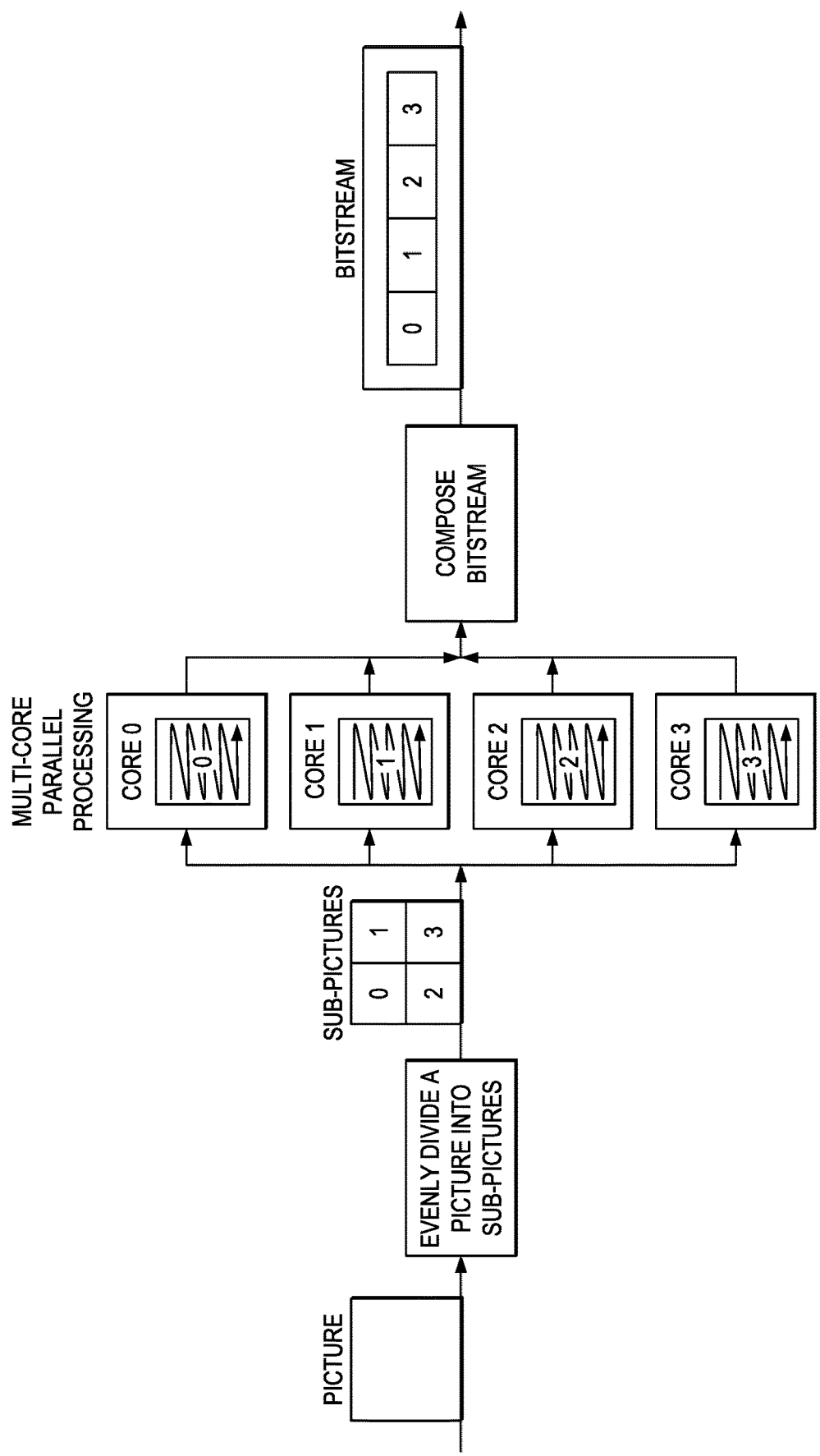
FIG. 6 is an embodiment of multi-core parallel processing with sub-pictures.
Figure 7:
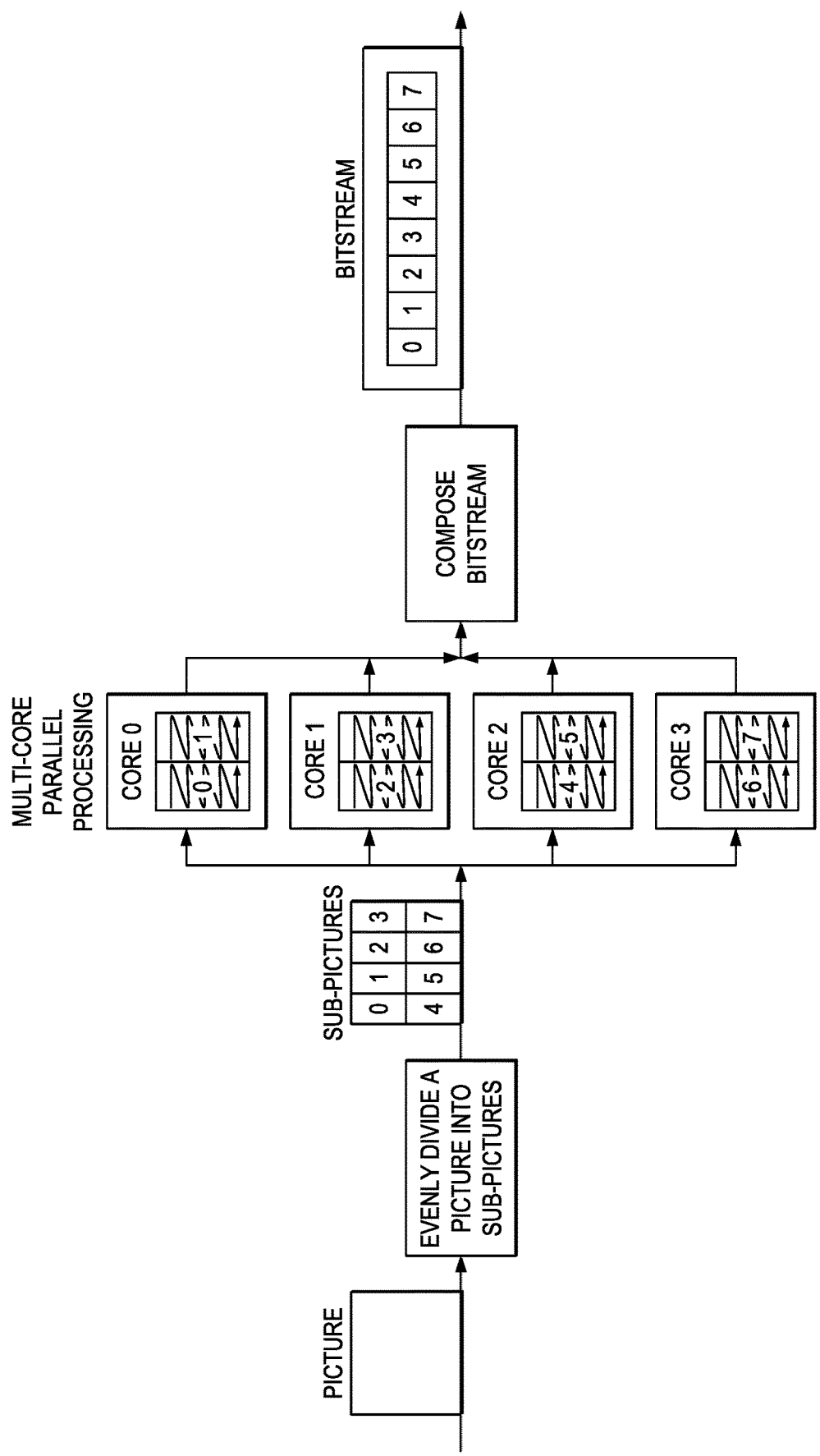
FIG. 7 is an embodiment of multi-core parallel processing and high quality video with sub-picture.

FIG. 5 is an embodiment of high quality coding with sub-pictures. The sub-pictures are evenly divided and encoded sequentially on a single-core in raster-scanning order within sub-pictures. The sub-pictures may have coding dependency around sub-picture boundaries. Coding dependency around sub-picture boundaries could include intra prediction mode prediction, motion vector prediction, entropy coding, de-blocking filter, adaptive loop-filter, etc. The sub-picture coding leads to larger vertical search range under a same amount of on-chip memory and thus high video quality FIG. 6 is an embodiment of multi-core parallel processing with sub-pictures. The sub-pictures are evenly divided and encoded parallels on multi-cores in raster-scanning order within sub-pictures on multiple video cores. To ensure parallelism, coding of sub-pictures is independent around sub-picture boundaries FIG. 7 is an embodiment of multi-core parallel processing of FIG. 5 and high quality video with sub-picture of FIG. 6. In FIG. 7, the sub-pictures are evenly divided and encoded parallels on multi-cores in raster-scanning order within sub-pictures. From core to core, the coding of sub-pictures, for example, sub-picture 0 & 1 vs. 2&3, is independent around sub-picture boundaries. But within a core, coding of sub-pictures, such as, sub-picture 0 and 1, maybe dependent around sub-picture boundaries.

While the foregoing is directed to embodiments of the present invention, other and further embodiments of the invention may be devised without departing from the basic scope thereof, and the scope thereof is determined by the claims that follow. It also should be noted that picture and/or image may be used interchangeably and refer to a single image/picture or to a series or images/pictures.

What is claimed is:

1. A method for sub-picture based raster scanning coding order, comprising: dividing a picture into a plurality of non overlapping blocks; partitioning the non overlapping blocks into a plurality of sub-pictures with sub-picture boundaries; coding of a first of the plurality of the sub-pictures and coding of a second of the plurality of the sub-pictures such that the coding of the first sub-picture and the coding of the second sub-picture is independent around the sub-picture boundaries; coding of the first sub-picture and the coding of the second sub-picture in parallel; and encoding the first and second sub-pictures sequentially into a bit stream upon completion of the coding wherein each of the first and second sub-pictures is encoded in a raster scan order.

2. The method of claim 1 wherein the number of the plurality of non overlapping blocks in the first sub-picture and the number of the plurality of non overlapping blocks in the second sub-picture are approximately the same.

3. The method of claim 1 wherein a size of the first sub-picture and a size of the second sub-picture differs both in a horizontal direction and in a vertical direction by an amount less than a size of a largest coding unit.

4. A method for sub-picture based raster scanning coding order, comprising: providing a picture partitioned into a plurality of sub-pictures wherein each sub-picture is divided into a plurality of non overlapping blocks; coding of a first of the plurality of the sub-pictures and coding of a second of the plurality of the sub-pictures wherein the coding of the first sub-picture and the second sub-pictures is independent around the sub-picture boundaries, and wherein the coding of the first sub-picture and the second sub-picture is performed in parallel; and encoding the first of sub-pictures and the second of the sub-pictures sequentially into a bit stream upon completion of the coding wherein each of the first of sub-pictures and the second of the sub-pictures is encoded in a raster scan order.

5. The method of claim 4, wherein the number of blocks in the first of sub-pictures and the second of the sub-pictures is approximately the same.

* * * * *